(12) United States Patent
Scordilis (10) Patent No.: US 6,959,528 B1
(45) Date of Patent: Nov. 1, 2005

(54) MOWER

(76) Inventor: Frank P. Scordilis, 119 Brandermill Rd., Spartanburg, SC (US) 29301

( * ) Notice: Subject to any disclaimer, the term of this patent is extended or adjusted under 35 U.S.C. 154(b) by 0 days.

(21) Appl. No.: 10/936,045

(22) Filed: Sep. 8, 2004

(51) Int. Cl.[7] .............................................. A01D 34/66
(52) U.S. Cl. ................... 56/15.8; 56/15.2; 56/6
(58) Field of Search ................ 56/295, 255, 6, 56/15.9, 15.8, 14.7, 15.2

(56) References Cited

U.S. PATENT DOCUMENTS

| | | | | |
|---|---|---|---|---|
| 2,838,901 A | | 6/1958 | Davis | 56/25.4 |
| 3,045,413 A | * | 7/1962 | Sheffer | 56/11.9 |
| 3,115,739 A | * | 12/1963 | Thoen et al. | 56/6 |
| 3,498,036 A | * | 3/1970 | Cowling et al. | 56/11.9 |
| 3,526,083 A | | 9/1970 | Barry et al. | 56/25.4 |
| 3,599,403 A | | 8/1971 | Gantz | 56/10.4 |
| 3,665,685 A | | 5/1972 | Allard | 56/10.4 |
| 3,715,872 A | * | 2/1973 | Thompson, Jr. | 56/10.4 |
| 4,573,306 A | | 3/1986 | Smith | 56/10.4 |
| 4,697,405 A | | 10/1987 | DeWitt et al. | 56/10.4 |
| 4,723,396 A | * | 2/1988 | Ermacora | 56/13.6 |
| 4,949,534 A | | 8/1990 | Evans | 56/6 |
| 5,396,754 A | | 3/1995 | Fraley | 56/15.2 |
| 5,425,224 A | | 6/1995 | Downey et al. | 56/15.8 |
| 5,761,890 A | * | 6/1998 | Lehman et al. | 56/6 |
| 6,860,093 B2 | * | 3/2005 | Scordilis | 56/15.2 |

FOREIGN PATENT DOCUMENTS

| | | |
|---|---|---|
| DE | 1 927 793 | 12/1970 |
| DE | 198 26 347 A1 | 12/1999 |
| EP | 1 305 993 A1 | 5/2003 |
| GB | 1 250 950 | 10/1971 |
| GB | 2 081 563 A | 2/1982 |

OTHER PUBLICATIONS

*Advertisement for The Polecat from T K Industries, Inc. (2 pages).

* cited by examiner

Primary Examiner—Meredith Petravick
(74) Attorney, Agent, or Firm—Charles L. Schwab; Nexsen Pruet, LLC

(57) ABSTRACT

A dual cutter head mower attachment particularly suited for mowing beneath guard rails, and fences which can be operated at either lateral side of a support vehicle. Support arms for the cutter heads are pivotally connected to the lower ends of upstanding legs of a U shaped support frame by releasable connections facilitating repositioning of the support arms when the mower attachment is to be operated at the opposite lateral side of the support vehicle.

14 Claims, 12 Drawing Sheets

MOWER

RELATED APPLICATIONS

Some features of the mower disclosed herein are similar to features found in my U.S. patent application Ser. No. 10/493,326 filed Apr. 21, 2004 now U.S. Pat. No. 6,860,093 for a Mower.

BACKGROUND OF THE INVENTION

When conventional mowers are used to mow the highway areas where guardrails or media safety cables are present, a strip of uncut vegetation is left beneath the guardrail or safety cable. In an attempt to remedy this problem a double cutter head mower has been marketed by others which places cutter heads on opposite sides of the guardrail or cable barrier. However, the performance of this previously marketed mowing machine has not been found to be entirely satisfactory in its adjustability, adaptability and controls to provide safe and satisfactory performance.

BRIEF SUMMARY OF THE INVENTION

The dual cutter head mower of this invention is designed as an attachment for a wheeled support vehicle, such as a tractor, to mow at either lateral side of the support vehicle. The main support frame of the mower is provided with three point hitch connections at its front and its rear so that the mower may be mounted on the front or rear of a tractor or reversed in either of those locations to mow on the other lateral side of the tractor. A subframe is provided which is laterally adjustable relative to the main support frame, thus allowing the cutter heads to be adjusted laterally. Parallel guide members and guided members of the main frame and the subframe are at the same elevation thereby providing a low profile and a convenient base for mounting a gear box, hydraulic pumps and a hydraulic tank.

The laterally inner and outer rotary cutter heads are supported on the lower ends of laterally inward and laterally outward upright legs of an inverted U shaped frame. The laterally inward upright leg is slidingly supported in a slide connector part of an intermediate frame in a manner permitting vertical adjustment of the mower heads. The laterally outward leg is part of an inverted L shaped member which includes the laterally outward upright leg and a horizontally extending overhead beam having a free end pivotally connected to the upper end of the laterally inward leg so as to permit the laterally outer cutter head and the supporting L shaped member to be swung from a lowered mowing position to an overhead position to clear various obstacles such as road signs, light poles, trees, walls, fences, shrubs, hedges and the like. A pivotal connection between the subframe and the intermediate frame on a fore and aft horizontal axis permits the U shaped frame and the cutter heads to be tilted to match a laterally upward or downward ground slope and also to be pivoted to a transport position.

The cutting heads are preferably disposed in offset relation to one another in the direction of travel during a mowing operation so that no vegetation is left uncut between the paths of the cutting heads. The cutting heads are mounted, respectively, on the free ends of support arms which are pivotally mounted, respectfully, on the lower ends of the vertical legs of the inverted U shaped member by pivot brackets which permit the mower heads to move laterally when a guard rail post or other obstacle is encountered. The pivot brackets are adjustable relative to the legs to permit repositioning of the support arms when the mower is positioned to cut on the other lateral side of the supporting vehicle. Adjustable springs are associated with the support arms so that when an obstacle is encountered by the rotatable cover of the cutter head, the cutter head can move laterally. After the obstacle is passed, the associated spring returns the cutter head to its previous position. Dampeners are provided to prevent the cutter head covers from impacting with one another upon clearing the obstacle. The springs and dampeners are repositioned when the mower support frame is reversed to mow on the other lateral side of the support vehicle.

The intermediate frame also includes a coupler which is pivotally connected to the slide connector on an axis parallel to the laterally inward leg of the U shaped frame. The coupler is also pivotally connected to a subframe on a fore and aft extending horizontal axis. A hydraulic actuator is interconnected between the coupler and the slide connector and is operable to pivot the U shaped frame and slide connector about the latter's pivot connection with the coupler to reposition the U-shaped frame when the mower is mounted on the other lateral side of the supporting vehicle.

The mower blades are driven by motors mounted near the ends of the mower head support arms which are pivotally attached to the pivot brackets on the lower ends of the upright legs of the U shaped frame. This laterally offset positioning of the drive motor provides a low profile cutting head for mowing under low guard rails, fences and the like. The pivot brackets supporting the support arms and the lower ends of the upright legs of the U shaped frame have connecting parts permitting the position of the support brackets on the legs to be changed when it is desired to operate the mower at the opposite lateral side of the support vehicle.

BRIEF DESCRIPTION OF THE DRAWINGS

The invention is illustrated in the accompanying drawings, in which.

DETAILED DESCRIPTION OF THE INVENTION

Figure 1:
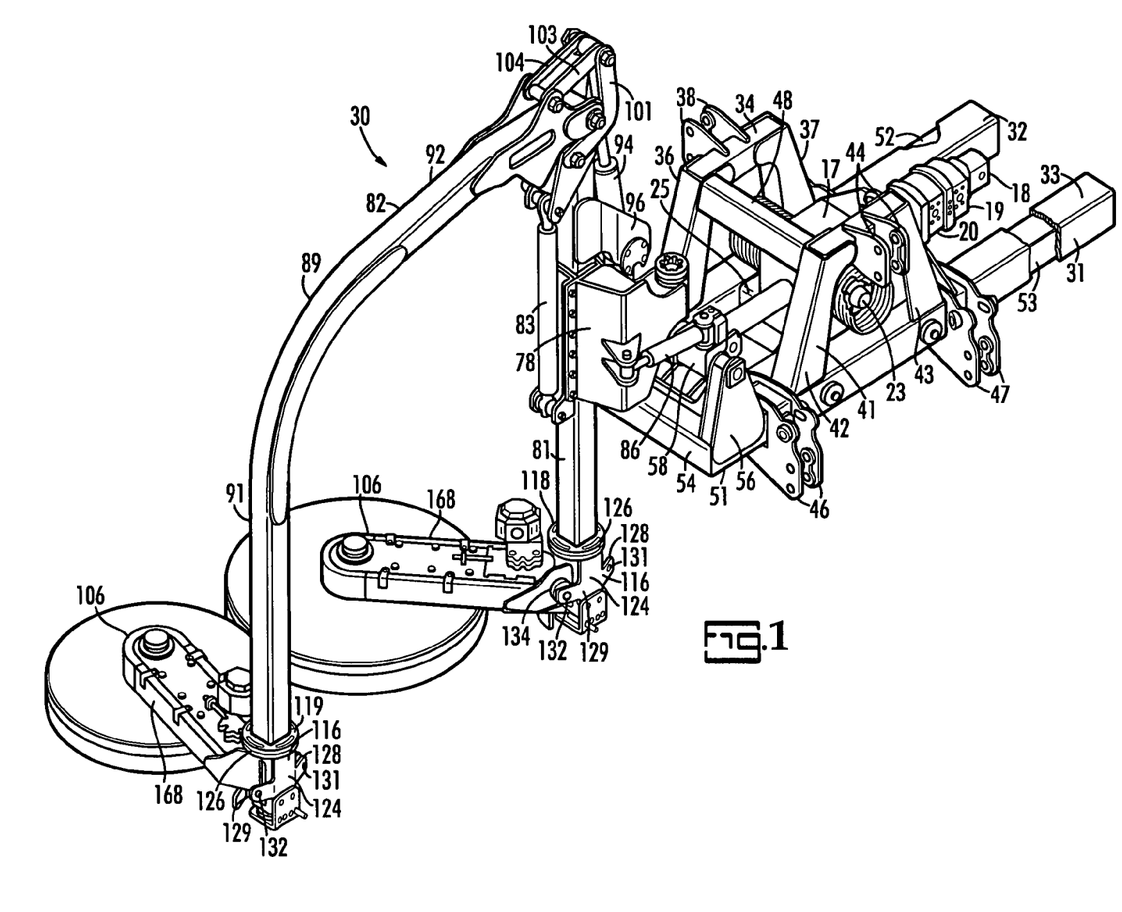
FIG. 1 is a perspective front view of the guardrail mower detached from the support vehicle.
Figure 2:
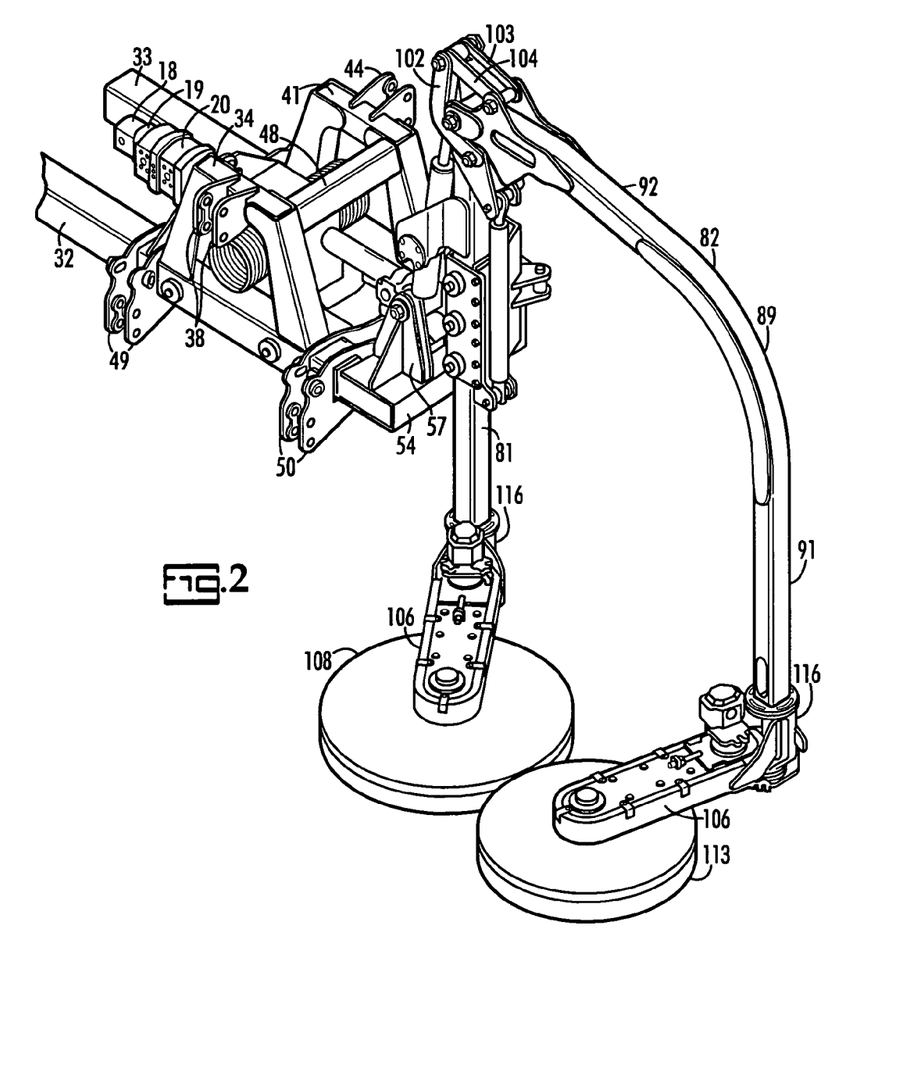
FIG. 2 is a perspective rear view of the mower of FIG. 1.
Figure 4:
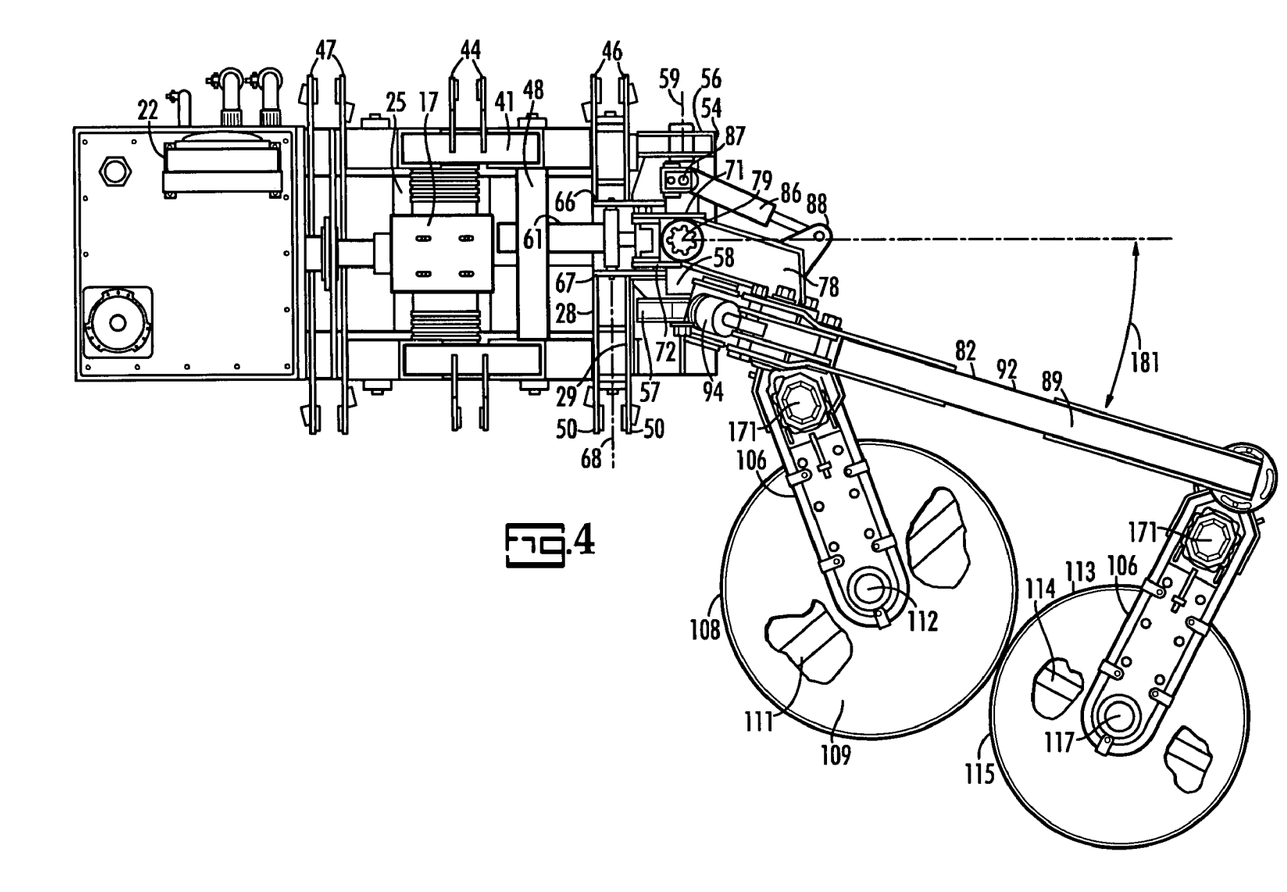
FIG. 4 is a top view of the mower with the mower head support frame pivoted rearwardly.
Figure 5:
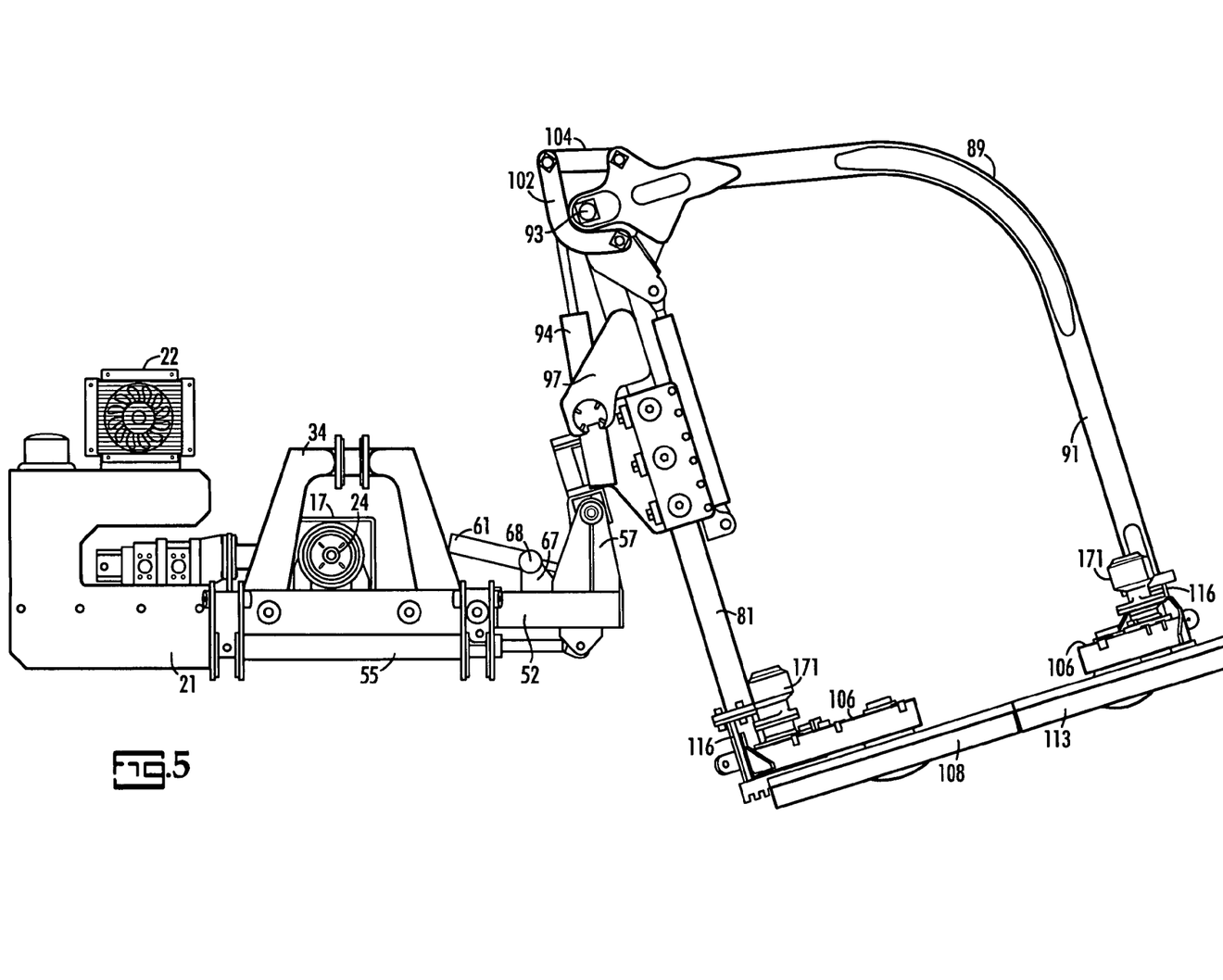
FIG. 5 is a rear view of the mower heads tilted to mow terrain sloping laterally upward.

FIG. 1 is a front perspective view of a dual cutter head mower 30 which is an attachment adapted for releasable connection to a three point hitch and to a power take off shaft of a tractor or other support vehicle. The mower 30 includes a main frame 31 which has a pair of parallel horizontally spaced square section hollow guide members or tubes 32, 33 which extend laterally in relation to a support vehicle at the same elevation. An upstanding arch 34 has legs 36, 37 welded at their lower ends to the guide tube 32 and a three point hitch connection 38 is provided at the top of the arch 34. In a similar manner an arch 41 has legs 42, 43 whose lower ends are welded to the guide tube 33 and a three point hitch connection 44 is formed at the top of the arch 41. A pair of laterally spaced lower three point hitch connections 46, 47 are mounted on the guide tube 33. The upper parts of the arches 34, 41 are rigidly interconnected by a strut 48 extending there between and the tubes 32, 33 are rigidly interconnected by struts 25, 26, 27, 28, 29, as shown in FIG. 4. Referring also to FIG. 2, a pair of laterally spaced lower three point hitch connections 49, 50 are mounted on the guide tube 32. Thus three point hitch connections are provided on both the front and rear sides of the main frame 31.

As shown in FIGS. 2–8 a gear box 17 mounted on a cross brace 25 of the main frame 31 has an output shaft connected in driving relation to three in-line hydraulic pumps 18, 19, 20 also mounted on the main frame 31. A hydraulic reservoir 21 is also mounted on the main frame 31 and a cooler 22 is mounted on top of the reservoir 21. The gear box is provided with a front power take off connector 23, as shown in FIG. 1, and a rear power take off connector 24, as shown in FIGS. 3, 5, 6, 7 and 8. The power take off connectors 23, 24 permit the mower 31 to be connected to one of the front or rear power take off shafts of a supporting vehicle when the mower 31 is mounted at the front or rear of the support vehicle and when the mower is mounted for mowing at either lateral side of the support vehicle. Thus the mower can be operated in four different positions relative to the support vehicle.

Figure 3:
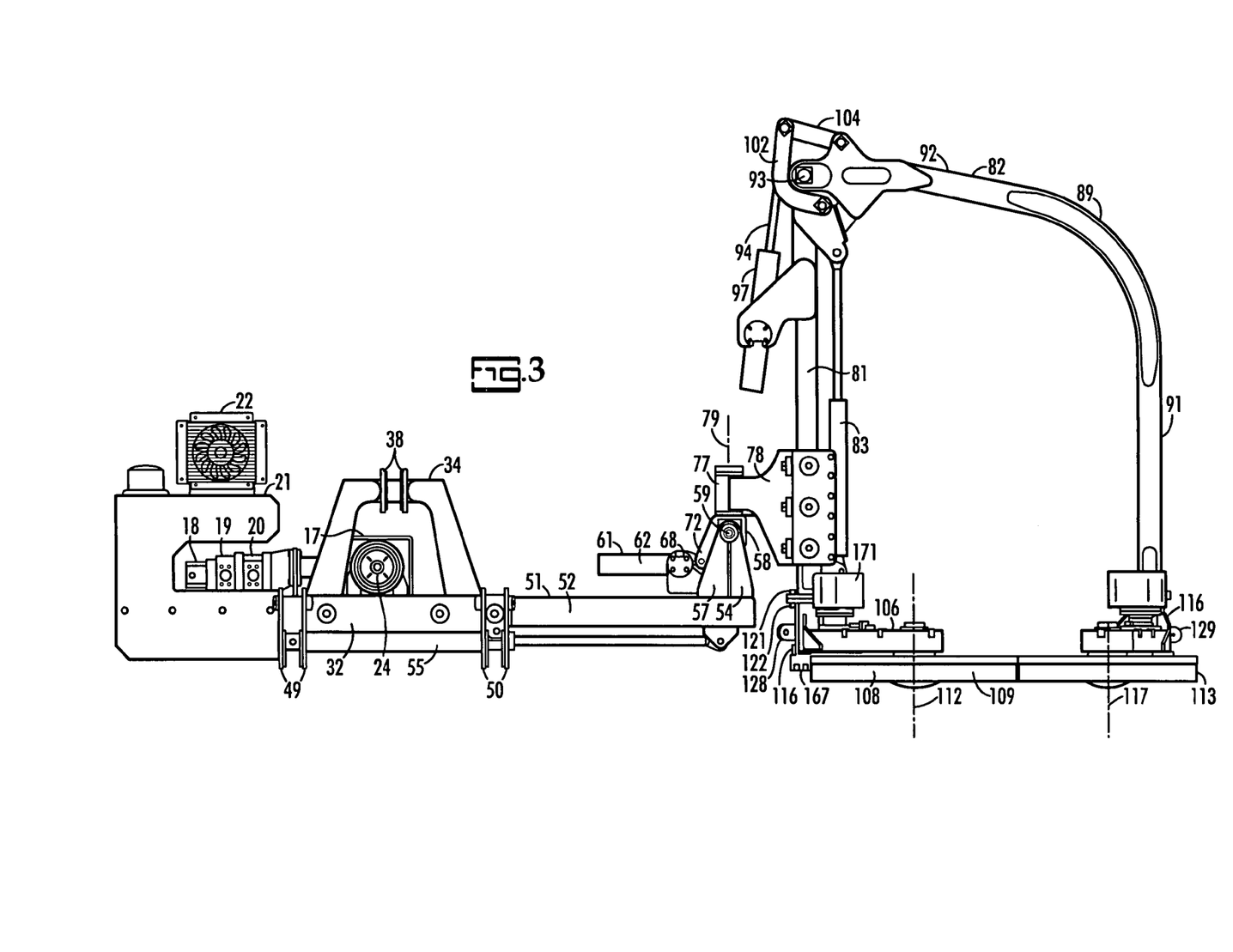
FIG. 3 is a rear view of the mower of FIG. 1 to which a hydraulic tank has been added and with the cutter heads shifted laterally.
Figure 6:
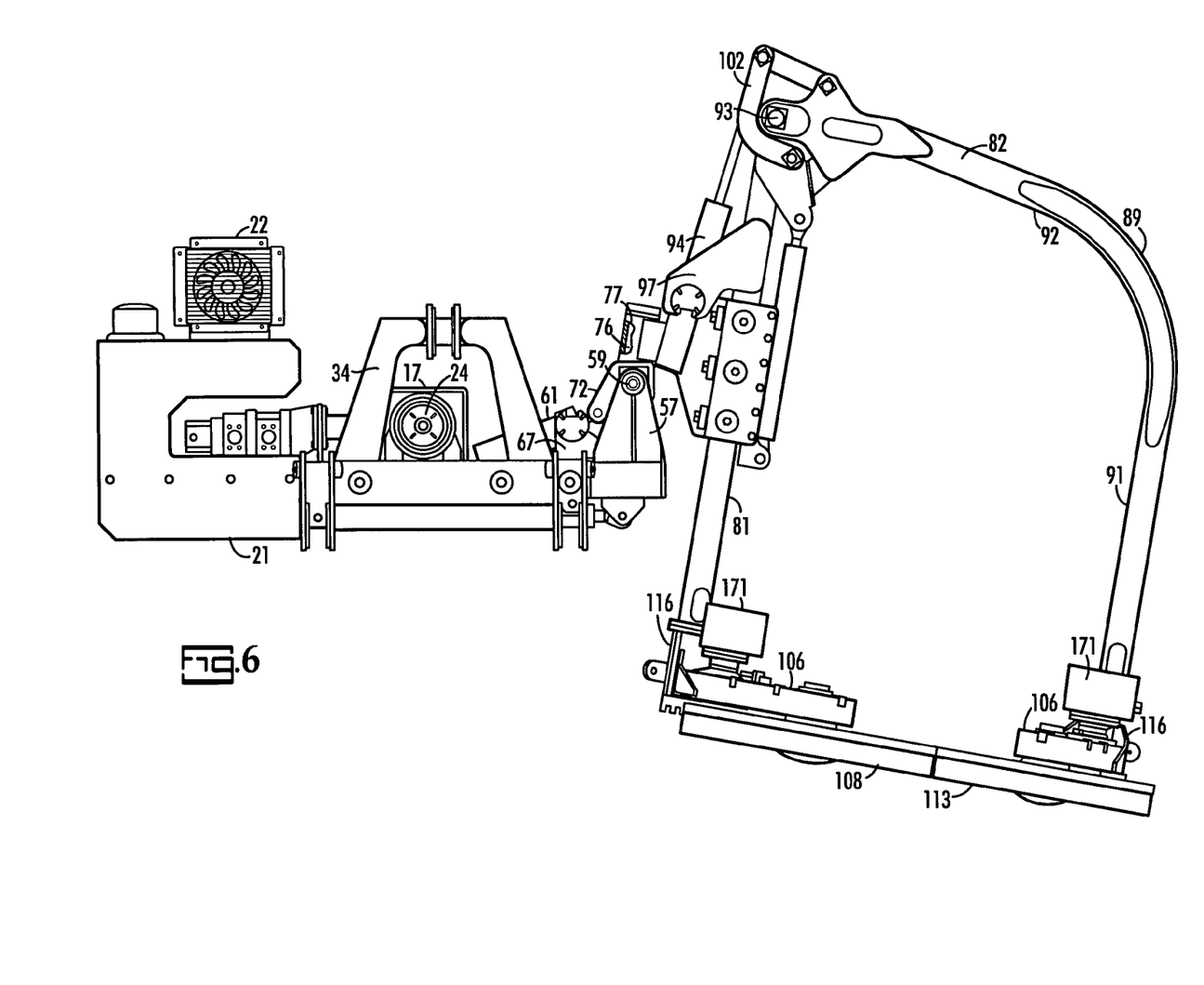
FIG. 6 is a view similar to FIG. 5 showing the mower heads tilted to mow terrain sloping laterally downward.
Figure 7:
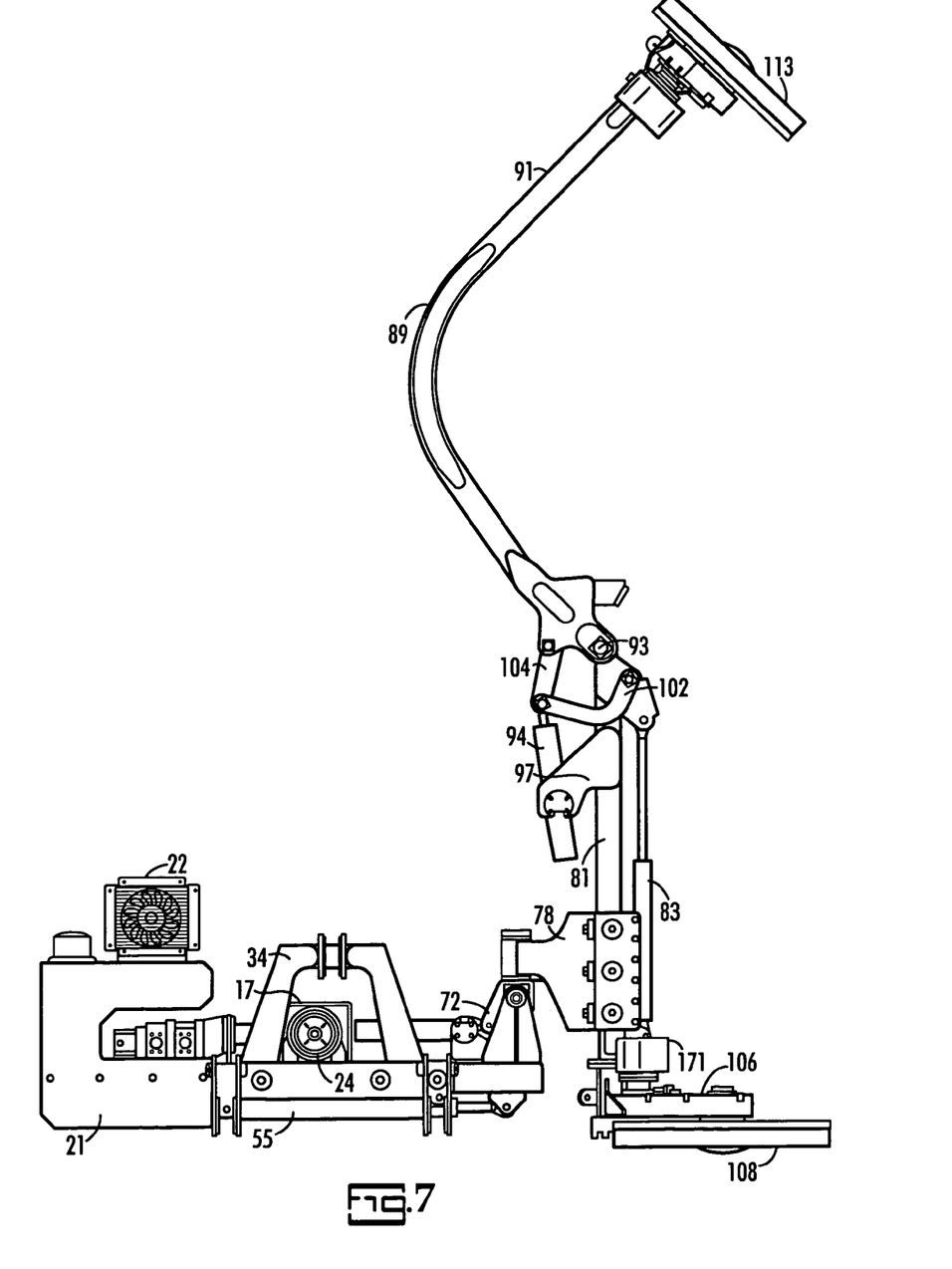
FIG. 7 is a rear view showing the outer mower head and its support raised to an overhead position.
Figure 8:
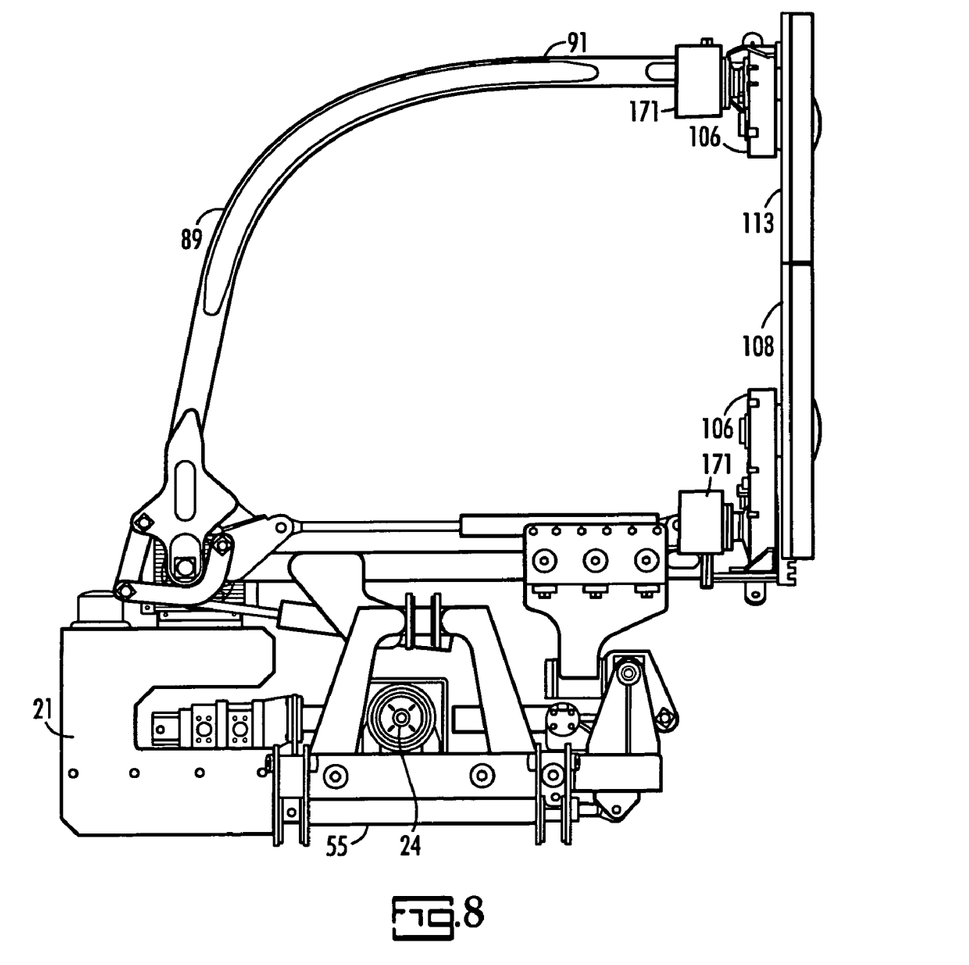
FIG. 8 is a rear view showing the mower in a transport position.
Figure 12:
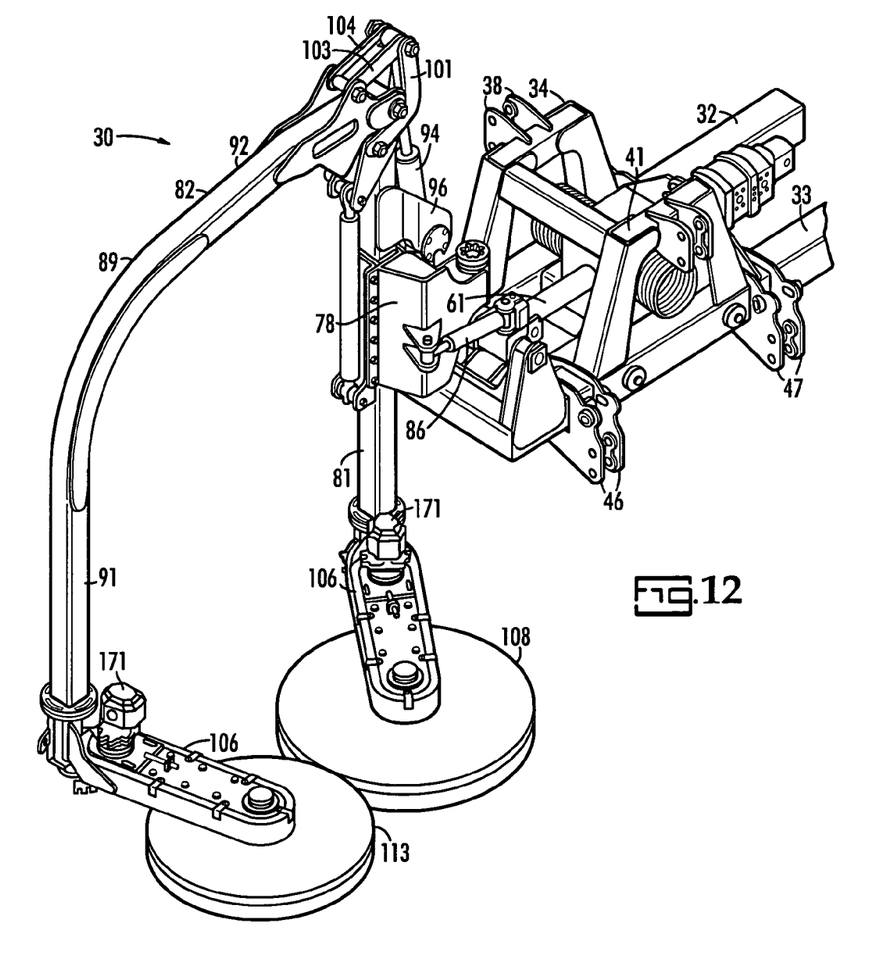
FIG. 12 is a partial rear perspective view of the mower ready for mowing at the other lateral side of the support vehicle.
Figure 13:
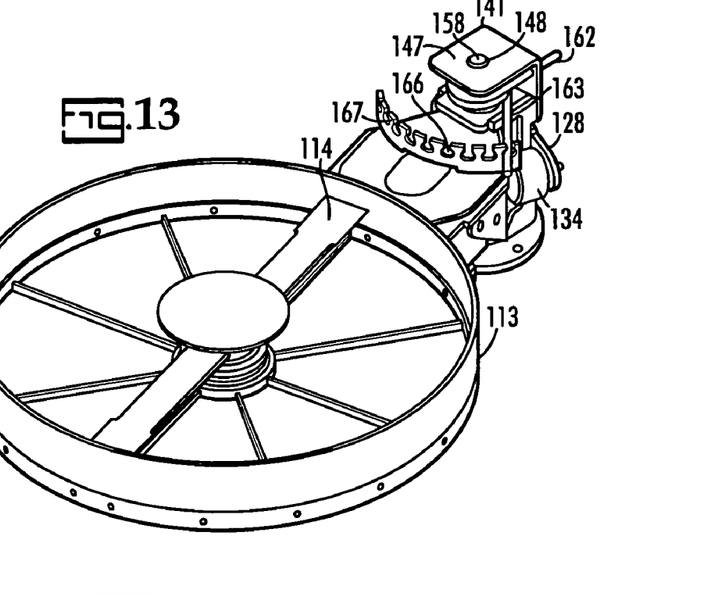
FIG. 13 is a perspective bottom view of a mower head.

A subframe 51 has a pair of parallel square section hollow guided members or tubes 52, 53 telescopically mounted in the guide tubes 32, 33, respectively, and a yoke 54 rigidly secured to the ends of the tubes 52, 53. As shown in FIG. 3, the subframe 51 is telescopically shifted laterally to and from the mainframe by a hydraulic actuator 55 interconnected between the main frame 31 and the subframe 51. FIG. 3 shows the subframe 51 shifted laterally to an outward extended position. The yoke 54 includes a pair of upstanding arms 56, 57 which are pivotally connected to a coupler 58 on a fore and aft extending axis 59. A hydraulic actuator 61 has its cylinder 62 connected in gimbals fashion to a pair of upright brackets 66, 67 of the yoke 54 on a fore and aft horizontal axis 68 and its rod end pivotally connected to downwardly extending arms 71, 72 of the coupler 58 on a fore and aft horizontal axis, not shown. The coupler 58 includes an upstanding pivot 76, as shown in FIG. 6, to which a boss 77 of a slide connector 78 is pivotally connected on a vertical axis 79. The slide connector 78 encompasses a laterally inner upright leg 81 of a U shaped frame 82 and a double acting hydraulic actuator 83 has its cylinder end pivotally connected to the slid connector 78 and its rod end pivotally connected to a pair of brackets rigidly secured to the leg 81. Expansion and contraction of the actuator 83 effects raising and lowering of the U shaped frame 82. Referring to FIGS. 1, 4 and 12, a double acting hydraulic actuator 86 has its cylinder end pivotally connected to the coupler 58 on an axis 87 parallel to the vertical axis 79 and has its rod end pivotally connected to the slide connector 78 on an axis 88 parallel to the axis 87.

The U shaped frame 82, which is fabricated using square section hollow tubes, includes an inverted L shaped segment 89 which includes an upright outer leg 91, the lower portion of which is parallel to the laterally inner leg 81. The upper part of the outer leg 91 curves laterally inward to an overhead part 92 whose laterally inner end is pivotally connected to the upper end of the inner leg 81 on a horizontally axis 93. The L shaped segment 89 is pivotable from its mowing position shown in FIGS. 1–6 to an overhead position shown in FIG. 7 by contraction of a double acting hydraulic actuator 94 having its cylinder pivotally connected to parallel brackets 96, 97 and its rod end pivotally connected to first corresponding ends of a pair of parallel links 101, 102. The second corresponding ends of links 101, 102 are pivotally connected to the upper end of the laterally inner leg 81. A second pair of parallel links 103, 104 have first corresponding ends pivotally connected to the rod end of the actuator 94 and second corresponding ends pivotally connected to the overhead part 92 of the L shaped frame 89. By contracting the hydraulic actuator 94, the L shaped frame 89 can be raised to the overhead position shown in FIG. 7.

Figure 11:
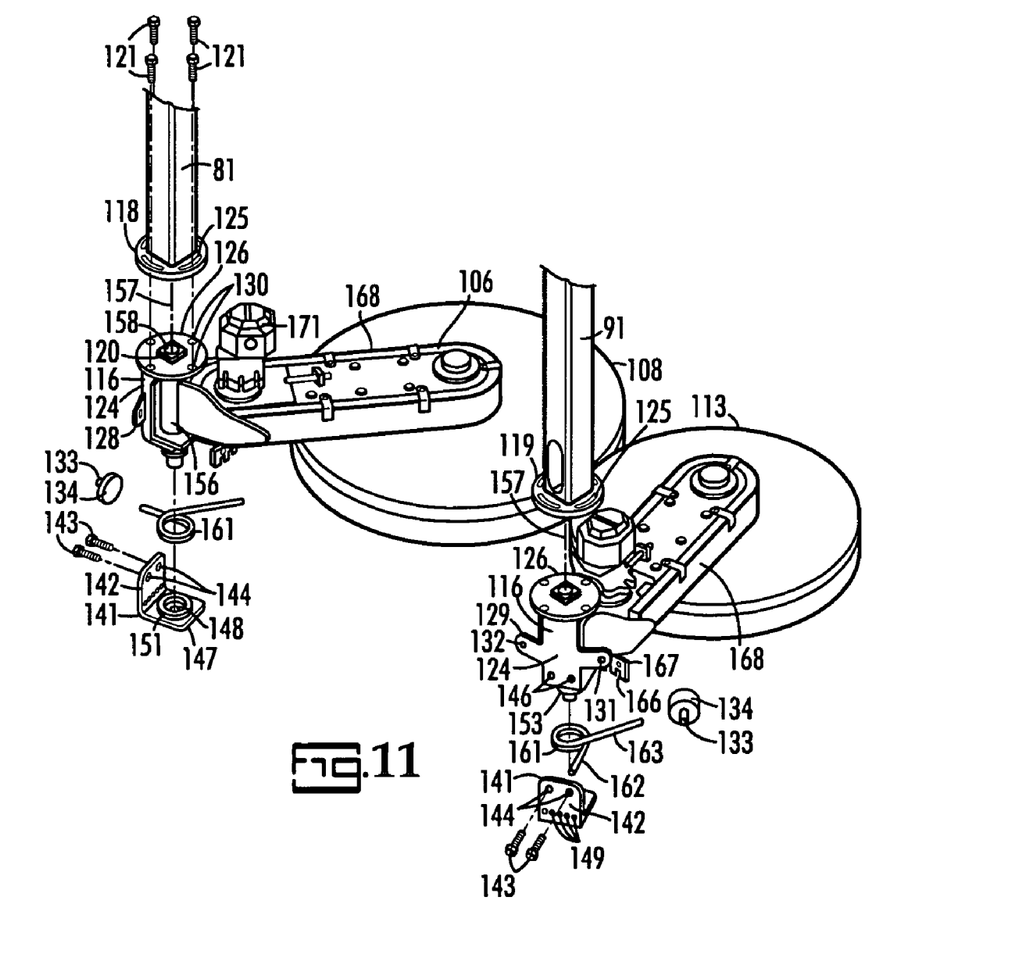
FIG. 11 is a view similar to FIG. 10 showing the spring supports, springs and dampeners removed from the pivot brackets.

As shown in FIGS. 3 and 4, a first cutter head support arm 106 is mounted on the lower end of the leg 81 and a second cutter head support arm 106 is mounted on the lower end of the leg 91. The support arms are identical in construction. The distal or free end of the support arm 106 mounted on the lower end of the leg 81 supports a cutter head 108 which includes a freely rotatable cover 109 and a driven cutting blade 111, both of which are rotatable about an upright axis 112. The distal or free end of the other cutter head support arm 106 supports a cutter head 113 having a rotatingly driven cutting blade 114 and a freely rotatable cover 115, both of which are rotatable about an upright axis 117. The cutter heads 108, 113 are positioned to cut overlapping swaths in a forward direction of travel. A pair of pivot brackets 116 have upper horizontal flanges 126 releasably secured, respectively, to the flanges 118, 119 on the lower ends of a the square section hollow legs 81, 91 by releasable fasteners in the form of nuts 122 and bolts 121 which extend through arcuate slots 125 in the associated one of the flanges 118, 119 and through openings 130 in upper horizontal flanges 126 of the pivot brackets 116. As shown in FIGS. 1 and 11, the pivot bracket 116 includes a vertical wall 124 rigidly secured to the upper horizontal flange 126 and a lower horizontal flange 127 secured to the lower end of the vertical wall 124. A journal box 156 on the proximal end of the support arm 106 is pivotally connected to the flanges 126, 127 on a vertical axis 157 by a pivot pin 158. A square projection 120 is rigidly secured to the upper end of the pivot pin 158 and extends upwardly into the lower end of the square section hollow leg 81 or 91 thus preventing relative rotation of the pivot pin 158 and aligning it with its associated leg 81 or 91. As shown in FIG. 1, the vertical wall 124 of the pivot bracket 116 has a pair of outwardly extending ears 128, 129 presenting horizontally extending threaded openings 131, 132 for receiving a threaded metal stud 133 of a rubber like shock absorber 134. The shock absorbers 134, which are clearly shown in FIG. 11, are in confronting engageable relation to a lateral side of their associated support arm 106.

Referring to FIGS. 9–15, the support bracket 116 includes a spring support angle 141 having a vertical wall 142 which is releasably secured to the lower end of the vertical wall 124 of the support bracket 116 by releasable fasteners in the form of cap screws 143 extending through openings 144 and threadingly engaging threaded openings 146 in the vertical wall 124. The support angle 141 has a horizontal wall 147 with a vertical opening 148 concentric with the pivot pin 158 and includes an annulus 151, secured thereto as by welding, which is axially aligned with the vertical opening 148. A plurality of horizontally spaced openings 149 are formed in the vertical wall 142 which is in radially spaced relation to the pivot pin 158. A boss 153 is mounted on the bottom of the lower horizontal flange 127 of the support bracket 116 and the boss 153 is dimensioned to fit at its lower end into the annulus 148. The vertical pivot pin 158 passes through the boss 153, is aligned with the annulus 151 and passes through the opening 148 in the horizontal wall 147 of the angle 141.

A coil spring 161 having a multiple turn coil and a pair of tangentially extending end segments 162, 163, is positioned on the boss 153 so that the boss 153 is in radially confronting relation to the inside diameter of the coil of the spring 161. In the installed position of the coil spring 161 and associated components, the end segment 162 of the coil spring 161 extends through one of the horizontally spaced openings 149 in the vertical wall 142 of the support angle 141 and the other end segment 163 of the coil spring 161 extends through one of a plurality of circumferentially spaced notches 166 formed in an arcuate bracket 167 welded to the underside of the associated mower head support arm 168. The arcuate bracket 167 is concentric with the pivot pin 158. The coil springs 161 bias the distal ends of the mower head support arms 168 toward each other and the shock absorbers 134 maintain a predetermined slight clearance between the mower heads 108, 113.

Figure 14:
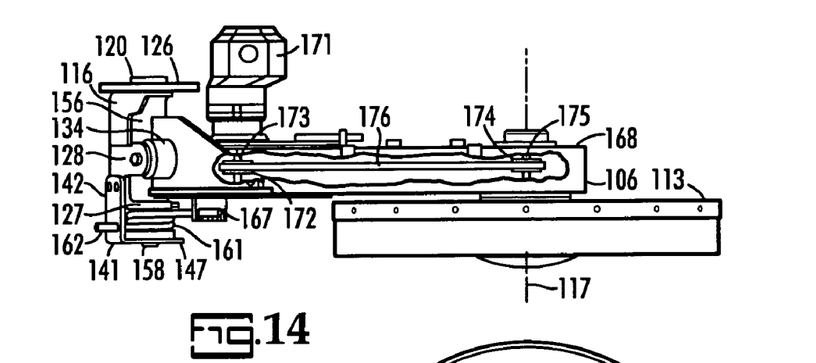
FIG. 14 is a side view of a mower head, support arm and pivot bracket.
Figure 15:
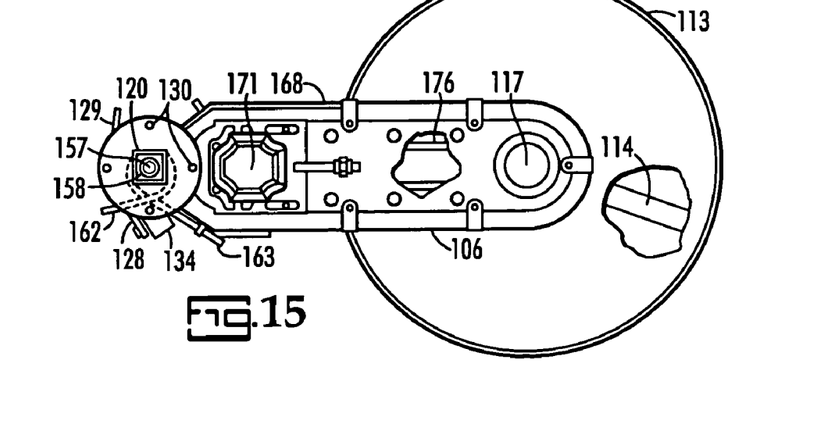
FIG. 15 is a top view of the mower head, support arm and pivot bracket shown in FIG. 14.

As shown in FIGS. 14 and 15 a hydraulic drive motor 171 for the mower head 113 is mounted on the distal end of the mower support arm 168 and has a V belt pulley 172 on the lower end of its vertical output shaft 173 which drives a V belt pulley 174 mounted on a vertical shaft 175 by an endless V belt 176 reeved on the pulleys 172, 174. The blade 14 of the mower head 113 is secured to the lower end of the shaft 174 and rotates therewith. As is evident upon viewing the various drawing figures, the vertical dimensions of the mower heads 108, 113 and the distal end of their support arm 168 is considerably reduced as compared with previously designed mowers having the drive motor directly above the rotating cutter. This allows the mower to be used for mowing below guard rails and fences with very low clearance thereby greatly increasing the utility of the mower.

Figure 9:
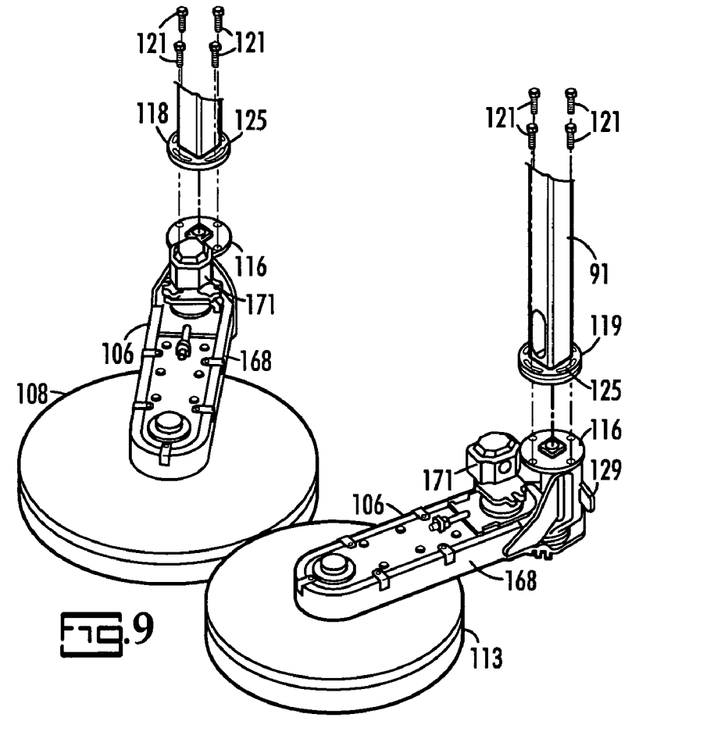
FIG. 9 shows the mower head support arms and their pivot brackets detached from the support legs.
Figure 10:
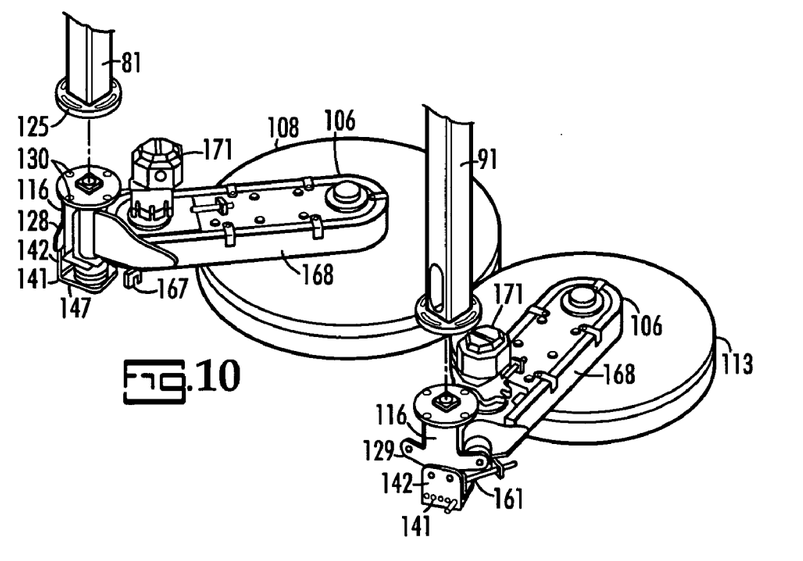
FIG. 10 shows the mower head support arms and pivot brackets repositioned relative to their support legs.

When it is desired to operate the mower at the other lateral side of the supporting vehicle, the pivot brackets 116 are removed from the legs 81, 91 by removing the bolts 121, as shown in FIG. 9, and the cutter heads 108, 113 and their support arms 168 are then repositioned relative to the legs 81, 91 as shown in FIG. 10. Then the end 163 of each of the springs is removed from the notch 166 of the associated bracket 167 and the angles 141 are removed from the walls 124 of the pivot bracket 116. The shock absorbers 134 are removed from the ears 128 and are installed on the ears 129 of the pivot brackets 116. The springs 161 are turned upside down and reinstalled on the bosses 153. The ends 162 of the springs 161 are inserted in selected horizontally spaced holes 149 in the angles 141 and the ends 163 of the springs 161 are placed in selected notches 166 on the other ends of the arcuate brackets 167. The pivot brackets 116 are reconnected to the legs 81, 91 by the bolts 121 and the 122 nuts. The arcuate slots 125 concentric with the axis 157 allow the mower support arms 106 to be repositioned for operation of the mower at the opposite lateral side of the support vehicle. The foregoing adjustments have repositioned the mower heads 108, 113 and their support arms 106 as shown in FIG. 12. FIG. 4 shows the U shaped frame 82 extending laterally at a trailing angle 181 of about 17 degrees. When the mower 30 is repositioned to operate at the other lateral side of the support vehicle, the hydraulic actuator 86 is contracted, as shown in FIG. 12, to effect a corresponding trailing angle for the U shaped frame 82. In the reversed position of the mower 30, as shown in FIG. 12, the hitch of the supporting tractor or vehicle is connected to the three point hitch components 38, 49, 50 and its power take off shaft is connected in driving relation to the power take off connector 24 shown in FIG. 3.

What is claimed is:

1. A mower attachment for a support vehicle having a forward direction of travel, a power take off shaft and three point hitch components at one or both of its front and rear ends, comprising:
    a main frame having a front side and rear side and including
        a horizontal guide member at said front side,
        a horizontal guide member at said rear side spaced horizontally from and rigidly connected to said front horizontal guide member, said horizontal guide members being parallel to one another and extending laterally in relation to said direction of travel at the same elevation,
        three point hitch components on said front side of said main frame, and
        three point hitch components on said rear side of said main frame,
    a plurality of in-line hydraulic pumps mounted on said main frame,
    a gear box mounted on said main frame and drivingly connected to said pumps, said gear box having a front power take off connector and a rear power take off connector,
    a subframe having a pair of guided members connected in guided relation to said horizontal guide members, respectfully,
    a hydraulic actuator interconnected between said main frame and said subframe operable to adjust said subframe laterally,
    a U shaped frame pivotally connected to said subframe on a horizontal axis extending in said direction of travel and presenting a pair of laterally spaced downwardly extending legs,
    a cutter head supported on the lower end of each of legs, each of said cutter heads having a rotatable cutting blade, and
    a hydraulic actuator interconnected between said subframe and said U shaped frame operable to pivot said U shaped frame about said horizontal axis to adjust the inclination of said cutter heads for mowing on terrain sloping laterally in relation to the terrain being traveled by said support vehicle and operable to pivot said U shaped frame to a travel position in which it is disposed above said main frame.

2. The mower attachment of claim 1 wherein said guide members are square section hollow tubes.

3. The mower attachment of claim 2 having a hydraulic tank mounted on said horizontal guide members.

4. The mower attachment of claim 2 having a first upstanding arch having an upper part and laterally spaced downwardly extending legs secured at their lower ends to said front horizontal guide members and a second upstanding arch having an upper part and laterally spaced downwardly extending legs secured at their lower ends to said rear tube and a three point hitch component secured to said upper part of each of said arches.

5. The mower attachment of claim 4 having a strut between said upper parts of said arches.

6. The mower attachment of claim 1 having a pair of cutter head support arms each having a distal end and a proximal end, said cutter heads being supported, respectively, on said distal ends, and said proximal ends being connected to the lower ends, respectively, of said legs and a hydraulic motor mounted near said proximal end, respectively, of each of said cutter head support arms, said motors being connected, respectively, in driving relation to said cutting blades of said cutter heads.

7. A mower attachment for a support vehicle having hitch connections at one or both of its front and rear ends and a forward direction of travel comprising:
   a main frame having a front side and a rear side and hitch connections on said front and rear sides permitting either one of said front and rear sides to be selectively attached to said hitch connections of said support vehicle,
   a sub frame adjustably mounted on said main frame for lateral movement relative to said main frame,
   a U shaped frame connected to said sub frame and having first and second laterally spaced upstanding legs,
   a pivot bracket secured to the lower end of each of said legs,
   a pair of cutter head support arms each having proximal and distal ends, said proximal ends being pivotally connected, respectively, by pivot pins to said pivot brackets for pivotal movement about laterally spaced vertical axes,
   a cutter head supported on the distal end of each of said arms, each of said cutter heads having a cutting blade rotatable about a vertical axis,
   a shock absorber between each of said pivot brackets and its associated cutter head arm, said shock absorbers limiting pivot movement of said support arms toward one another,
   a coil spring between each of said pivot brackets and its associated cutter head arm biasing said associated cutter head arm against said shock absorber, and
   a drive motor mounted on said proximal end of each of said support arms, said drive motor being connected in driving relation to said cutting blade of said cutter head on said support arm on which said drive motor is mounted.

8. The mower attachment of claim 7 wherein said coil spring includes a coil concentric with said vertical axis about which the associated cutter head support arm pivots and first and second tangentially extending ends connected, respectively, to said associated cutter head support arm and the associated pivot bracket.

9. The mower attachment of claim 8 wherein said coils of said coil springs are supported, respectively, on said pivot brackets.

10. The mower attachment of claim 9 having an arcuate bracket on the underside of said proximal end of each of said cutter head support arms, said arcuate brackets being spaced radially from and substantially concentric with the associated pivot pins, respectively, said arcuate brackets having circumferentially spaced downwardly open notches, said first tangentially extending end of said spring extending into one of said notches.

11. The mower attachment of claim 10 wherein each of said support brackets include a vertical wall spaced radially from its associated pivot pin, said vertical wall including horizontally spaced openings and said second end of said spring extending into one of said horizontally spaced openings.

12. The mower attachment of claim 7 wherein said support arms extend from said legs in trailing relation to said U shaped frame with said cutter heads positioned to cut slightly overlapping swaths in said forward direction of travel and wherein said pivot brackets are secured to said legs by releasable connections permitting repositioning of said support arms so they extend in trailing relation to the other side of said U shaped frame when said mower attachment is connected to said support vehicle using said hitch connections on said rear side of said main frame.

13. The mower attachment of claim 12 wherein said releasable connections includes a first flange on said lower end of each of said legs, a second flange on each of said pivot brackets in confronting relation to said first flange on the associated leg, a plurality of aligned openings in said first flanges, said openings in said first flanges on said lower ends of said legs being arcuate slots and releasable fasteners extending through said aligned openings and releasably securing said flanges to one another.

14. The mower attachment of claim 12 wherein said legs are square section hollow tubes and each of said pivot pins have a square projection on its upper end extending into and in coupling relation to the associated leg.

* * * * *